(12) United States Patent
Streblau

(10) Patent No.: US 10,167,882 B2
(45) Date of Patent: Jan. 1, 2019

(54) LOOP-FLUSHING-SYSTEM FOR HYDROSTATIC APPARATUS

(71) Applicant: Danfoss Power Solutions GmbH & Co. OHG, Neumunster (DE)

(72) Inventor: Arne Streblau, Nortorf (DE)

(73) Assignee: Danfoss Power Solutions GmbH & Co. OHG, Neumunster (DE)

( * ) Notice: Subject to any disclaimer, the term of this patent is extended or adjusted under 35 U.S.C. 154(b) by 234 days.

(21) Appl. No.: 15/051,858

(22) Filed: Feb. 24, 2016

(65) Prior Publication Data

US 2017/0023032 A1 Jan. 26, 2017

(30) Foreign Application Priority Data

Jul. 23, 2015 (DE) .................. 10 2015 213 936

(51) Int. Cl.
| | | |
|---|---|---|
| *F16H 61/4104* | (2010.01) | |
| *F15B 21/04* | (2006.01) | |
| *F15B 7/00* | (2006.01) | |
| *F15B 13/02* | (2006.01) | |
| *F15B 21/00* | (2006.01) | |

(Continued)

(52) U.S. Cl.
CPC ............ *F15B 21/042* (2013.01); *F15B 7/006* (2013.01); *F15B 13/024* (2013.01);
(Continued)

(58) Field of Classification Search
CPC ............ F16H 61/4104; F16H 61/4139; F16H 61/4131; F16H 61/4043; F16H 61/4165;
(Continued)

(56) References Cited

U.S. PATENT DOCUMENTS

| 2,122,045 A | * | 6/1938 | Rose | ...................... F16H 61/40 |
| | | | | 137/494 |
| 4,759,261 A | * | 7/1988 | Flieter | ..................... F04B 53/08 |
| | | | | 137/112 |

(Continued)

FOREIGN PATENT DOCUMENTS

| CN | 102042426 A | 5/2011 |
| CN | 102401127 A | 4/2012 |

(Continued)

OTHER PUBLICATIONS

Machine translation to English of EP2613058 from espacenet. 2013.*

*Primary Examiner* — F. Daniel Lopez
*Assistant Examiner* — Michael Quandt
(74) *Attorney, Agent, or Firm* — McCormick, Paulding & Huber LLP

(57) ABSTRACT

A valve housing includes a cylindrical valve bore with a high pressure inlet, a low pressure inlet and a discharge outlet. A first flushing valve spool is arranged elastically pre-stressed within the valve bore for enabling a fluid connection between the low pressure inlet and the discharge outlet. A shuttle valve spool is arranged elastically pre-stressed within the valve bore for enabling the fluid connection between the low pressure inlet and the discharge outlet. The first flushing valve spool is moveable into an open position if the fluid pressure at the low pressure inlet exceeds a first threshold value, and the shuttle valve spool is moveable into an open position for connecting the low pressure inlet with the discharge outlet, if the pressure difference between the high pressure inlet and the low pressure inlet exceeds a second threshold value.

20 Claims, 11 Drawing Sheets

(51) Int. Cl.
*F16H 61/4165* (2010.01)

(52) U.S. Cl.
CPC .......... *F15B 21/005* (2013.01); *F15B 21/045* (2013.01); *F16H 61/4104* (2013.01); *F15B 2211/20561* (2013.01); *F15B 2211/20569* (2013.01); *F15B 2211/27* (2013.01); *F15B 2211/3052* (2013.01); *F15B 2211/31558* (2013.01); *F15B 2211/50518* (2013.01); *F15B 2211/5159* (2013.01); *F15B 2211/611* (2013.01); *F15B 2211/62* (2013.01); *F16H 61/4165* (2013.01)

(58) Field of Classification Search
CPC ........ F15B 2211/3052; F15B 2211/611; F15B 2211/613; F15B 2211/62; F15B 13/024; F15B 13/028; F15B 21/042; F04B 53/08
See application file for complete search history.

(56) References Cited

U.S. PATENT DOCUMENTS

| 6,430,923 | B1 | 8/2002 | Meier |
| 6,817,177 | B2 * | 11/2004 | Bigo ...................... F16K 17/18 |
| | | | 60/464 |
| 8,347,620 | B2 * | 1/2013 | Yu ...................... F16H 61/4043 |
| | | | 137/240 |
| 2005/0005600 | A1 | 1/2005 | Gandrud |
| 2009/0101216 | A1 | 4/2009 | Donders |
| 2014/0150880 | A1 | 6/2014 | Rousseau et al. |

FOREIGN PATENT DOCUMENTS

| EP | 2 314 897 A2 | 4/2011 |
| EP | 2 613 058 A2 | 7/2013 |

* cited by examiner

LOOP-FLUSHING-SYSTEM FOR HYDROSTATIC APPARATUS

CROSS REFERENCE TO RELATED APPLICATION

Applicant hereby claims foreign priority benefits under U.S.C. § 119 from German Patent Application No. DE 102015213936.0 filed on Jul. 23, 2015, the content of which is incorporated by reference herein.

TECHNICAL FIELD

This invention relates to a hydraulic loop-flushing device for a hydrostatic apparatus. The present invention also relates to a hydraulic apparatus using such a loop-flushing device.

BACKGROUND

In hydraulic machines with a closed circuit for the hydraulic fluid, like e.g. hydrostatic drives or propel systems, in particular in hydrostatic machines like hydrostatic pumps and hydrostatic motors the hydraulic fluid used for the generation of hydraulic forces and hydraulic performance suffers of elevated temperatures during operation of the machine or apparatus, respectively. Additionally, during operation, movable parts of the hydrostatic apparatus, as e.g. bearings, shaft bearings, guiding shoes, etc. need to be lubricated for its proper function as well as for being prevented of overheating. This lubrication and prevention of overheating is typically performed by a loop-flushing-system which creates, in addition to unavoidable leakages of valves, rotating and movable parts in the system, an intended fluid leakage from the low pressure side of the hydrostatic apparatus to a low pressure area of the hydraulic apparatus, e.g. to a housing of the apparatus or to a tank. Commonly, this fluid leakage in hydrostatic systems is filled up again by a charge pump pumping fresh and "cold" oil from the housing/tank into the hydraulic circuit at the low pressure side.

An implemented loop-flushing-system in a hydraulic apparatus controls the loop-flushing flow according to both the pressure level at the low pressure side and the pressure delta between the high and low pressure side in the hydrostatic circuit. The hydraulic fluid of the flushing system passes the movable parts, e.g. the bearings, for lubricating and cooling them. This deviated loop-flushing fluid flow is usually collected in the housing and/or in a tank for being conveyed further to a hydraulic fluid cooler before sucked again by the charge pump. The charge pump pressurizes the cooled hydraulic fluid and pumps it back into the low pressure side of the hydraulic circuit according to the pressure levels and operational conditions of the hydraulic apparatus.

The highest fluid temperature in a hydrostatic machine or system usually occurs in a hydraulic driving mechanism, like a rotational kit of a hydraulic machine. That is why the loop-flushing-system is frequently integrated in a hydraulic motor of a hydraulically driven system and flushes the fluid into the motor case, which is often connected to a tank by a drain line. Common loop flushing systems comprise a shuttle valve to select the low pressure side by using the low pressure as well as the high pressure for switching the shuttle valve into the adequate position. In its open position the shuttle valve opens a fluid path at the low pressure side to branch off hydraulic fluid from the low pressure line. Commonly, both end faces of a shuttle-valve spool are thereby pressurized either by low pressure or high pressure, respectively. If a predefined delta pressure between the low pressure side and the high pressure side is present the shuttle valve spool is shifted into one of its open positions and fluid connection to the area of low pressure could be enabled in cooperation with a flushing valve. If the pressure in a connection line between the shuttle valve and the flushing valve reaches a given threshold pressure the flushing valve opens as well and hydraulic fluid from the low pressure side of the hydraulic propel system could be flushed for lubricating and cooling of (moveable) parts of the hydraulic apparatus accordingly. After being collected in the housing or in a tank the used flushing fluid is passed then, for instance, to a cooler before being introduced again into the low pressure side of the hydraulic apparatus by the charge pump.

Such commonly known loop-flushing-systems are descript, e.g. in US 2014/0150880 A1. Here, a control valve is arranged between the shuttle valve and the flushing valve for overriding the normal function of the flushing circuit during certain machine operational events where flushing can cause undesirable performance issues. U.S. Pat. No. 6,430,923 B1 shows another known flushing circuit, in which the actuation of the shuttle valve spool is controlled by a microcontroller. A further flushing valve for closed hydraulic circuits of a hydraulic apparatus is shown in EP 2 314 897 A2. In this system the shuttle valve alone fulfills the selection function for detecting the high pressure side and the low pressure side as well as the function for flushing hydraulic fluid from the low pressure side to a tank. Hereby, flushing from the low pressure side is always enabled as long as the pressure in the low pressure line is higher than the tank pressure. Furthermore, this system allows a constant non-adjustable flow from the low pressure side to tank.

The disadvantages of all these flushing systems known from the state of the art are either that a permanent flushing takes place (EP 2 314 897 A2) or the loop-flushing systems can create pressure oscillations which could be carried forward to the low pressure side of the hydraulic circuit, at least producing an undesired, unusual and/or inexplicable noise. This e.g. occurs if the pressure at the low pressure side of the hydraulic propel system is slightly higher than the shifting pressure of the shuttle valve. In this state the shuttle valve is positioned in its opening position allowing hydraulic fluid connection between the low pressure side and the flushing valve. If the pressure in the connection line before the flushing valve is higher than the pressure needed to open the flushing valve the flushing valve opens and drains hydraulic fluid into the low pressure area. By opening the flushing valve the pressure in the connection line before the flushing valve drops down. If the pressure drops under the pressure level necessary for maintaining the flushing valve open, the flushing valve closes again. Subsequently, the pressure in the connection line before the flushing-valve spool increases as the pressure in the low pressure side of hydraulic propel system is higher than the opening pressure of the shuttle valve, such that the flushing valve opens again if the pressure force on the flushing valve spool is high enough. If the pressure excess in the low pressure line is less than the pressure drop occurring when opening the flushing valve, the flushing valve closes again. This periodical opening and closing of the flushing-valve occurs as long as the pressure at the low pressure side of the hydraulic device does not exceeds the opening pressure of the flushing valve by an amount higher than the pressure drop caused by the opening of the flushing valve. These oscillations of opening and closing the flushing-valve generate/cause a noise insinuating damages in the hydraulic system. Further, these oscillations may also hinder the effective and/or optimal cooling of the hydraulic fluid and the movable components of the hydraulic system as no controlled constant flush flow can be established. These oscillations are further carried back into the low pressure line probably causing further disturbances.

SUMMARY

Therefore, it is an objective of the present invention to provide a loop-flushing-system, with which such oscillations and noises do not occur during operation of a hydraulic apparatus or system. A further objective of the present invention is to provide a loop-flushing-system being economical and reduced in its construction space, allowing thereby reducing the size of a hydraulic apparatus and/or a hydraulic system. A further aspect of the invention is to provide a loop-flushing-system which can be used in existing hydraulic apparatus or systems, without causing large modifications on existing parts. A further objective of the present invention is to provide a loop-flushing-system which can be used in existing hydraulic apparatus or systems in the manner of spare parts or as a reparation set or tuning kit.

All objectives are solved by a loop-flushing-system including, a valve housing having a cylindrical valve bore with a high pressure inlet, a low pressure inlet and a discharge outlet, a first flushing valve spool being arranged elastically pre-stressed within the valve bore for enabling a fluid connection between the low pressure inlet and the discharge outlet by means of a first fluid channel, a shuttle valve spool being arranged elastically pre-stressed within the valve bore for further enabling the fluid connection between the low pressure inlet and the discharge outlet by means of a fluid passageway, wherein the first flushing valve spool is moveable into an open position, in which the first fluid channel is open, if the fluid pressure at the low pressure inlet exceeds a first threshold value, and wherein the shuttle valve spool is moveable into an open position, in which the fluid passageway is open for connecting the low pressure inlet with the discharge outlet, if the pressure difference between the high pressure inlet and the low pressure inlet exceeds a second threshold value, wherein the first flushing valve spool and the shuttle valve spool are arranged concentrically and moveable relative to each other, and wherein the fluid connection between the low pressure inlet and the discharge outlet is enabled only, if both the first flushing valve spool and the shuttle valve spool are in the respective open positions. The objectives of the invention given above are also solved by a hydraulic apparatus wherein a high pressure inlet is fed by a high pressure line of the hydraulic apparatus, a low pressure inlet is fed by a low pressure line of the hydraulic apparatus and wherein a discharge outlet leads into a housing or a tank of the hydraulic device.

The inventive hydraulic fluid loop-flushing device to be used in hydrostatic apparatus comprises a valve housing having a cylindric valve bore within. The cylindric valve bore comprise a high pressure inlet, a low pressure inlet and a discharge outlet. A first flushing valve spool is arranged elastically pre-stressed within the valve bore for enabling a fluid connection between the low pressure inlet and the discharge outlet by means of a first fluid channel provided in the flushing valve spool. Further, a shuttle valve spool is arranged elastically pre-stressed within the valve bore too, for further enabling the fluid connection between the low pressure inlet and the discharge outlet by means of a fluid passageway provided by the shuttle valve spool. Thereby, the first flushing valve spool is movable into an open position, in which the first fluid channel is open, if the fluid pressure at the low pressure inlet exceeds a first threshold value. The shuttle valve spool is movable into an open position, in which the fluid passage way is open for connecting the low pressure inlet with the discharge outlet, only if the pressure difference between the high pressure inlet and the low pressure inlet exceeds a second threshold value. As the flushing valve spool and the shuttle valve spool are arranged concentrically and are movable relative to each other in the valve bore, a fluid connection between the low pressure inlet and the discharge outlet is enabled only if, simultaneously, both the flushing valve spool and the shuttle valve spool are in their respective open positions.

In the systems known from the state of the art the shuttle valve and the flushing valve are arranged hydraulically in series such that the flushing flow passing the shuttle valve acts subsequently on the flushing valve. Therefore, a drop of pressure in the hydraulic fluid passing the shuttle valve influences the actuation of the flushing valve. If, in the state of the art, the pressure difference between the high pressure side and the low pressure side of a hydraulic system is just a little bit higher than the opening pressure for the shuttle valve, the cross section for hydraulic fluid flow passing on to the flushing valve is poor. This causes oscillating openings and closings of the flushing valve as explained in detail above. This is one aspect being avoided by the invention as both the shuttle valve and the flushing valve are arranged hydraulically in parallel with respect to their opening forces. The same pressure level acting on the shuttle valve for shifting the shuttle valve spool in the adequate position also act on the flushing valve spool for opening and closing the same.

According to the invention the shuttle valve and the flushing valve are arranged hydraulically in parallel to each other such that the flushing valve is opened if the pressure in the corresponding working line of the hydraulic device exceeds at least a first threshold level for opening flushing valve. Thus, the opening of the flushing valve is independent of the pressure or the amount of hydraulic fluid flow passing the shuttle valve. If the pressure in one or both working lines of a hydraulic (propel) system equipped with an inventive hydraulic fluid loop-flushing device exceeds the opening pressure for the flushing valve (first threshold value) the same opens and stays open as long as the pressure in the working line exceeds this first threshold value. Hereby, the first threshold value corresponds to opening pressure for the flushing-valve.

In case the inventive hydraulic loop-flushing device is used in a hydraulic system in which the high pressure side and the low pressure side are interchangeable, for instance in a hydraulic motor or hydraulic pump, a second flushing valve could be arranged concentrically with the shuttle valve for the second pressure line or working line as well. In such a case a loop-flushing device is provided for both operational modes, in which the high pressure side and the low pressure side changes according to the operational state of the hydraulic apparatus. This is the case for instance for a hydraulic motor for the two rotational directions, e.g. forward and reverse or if the motor is in an acceleration or deceleration mode. In the latter, the rotational direction of the hydraulic motor is not changed.

In case one flushing valve for each working line is arranged in the inventive hydraulic fluid loop-flushing device, one of the flushing valves opens if the pressure at the high pressure side exceeds a first threshold pressure value for opening the first flushing valve. The second flushing valve opens only if the low pressure exceeds as well a first threshold pressure value, which can be the same as for the first flushing valve, however, must not be the same. In any case, the first threshold value should be chosen to a pressure level which will be exceeded by the low pressure level in normal operational conditions for a hydrostatic device. Only in emergency or other extreme operational conditions flushing should be disabled. A person skilled in the art will see easily the possibility that the opening pressures for two flushing valves in an inventive hydraulic fluid loop-flushing device could be different, as e.g. it could desired for instance for different loop-flushing behavior in acceleration or deceleration mode of a hydraulic propel system. This could be done for instance by varying the cross section of the fluid channel in the flushing valve spool, e.g. the diameter of an orifice forming the fluid channel.

As flushing takes places only if both the flushing valve(s) and the shuttle valve are in its respective open positions, the flushing valve at the high pressure side can remain in its open position as long as the threshold value for the opening pressure is exceeded in the high pressure working line. Loop-flushing according to the invention only takes places if, simultaneously, the pressure difference between low and high pressure side exceeds a second given threshold value, and therefore the shuttle valve opens a fluid connection on the low pressure side of the hydraulic device.

The function of the shuttle valve used in the inventive loop flushing system is like a common shuttle valve, i.e. the shuttle valve spool is elastically prestressed on both end portions. In its initial position the shuttle valve spool is centered in the valve bore by two shuttle valve springs closing thereby both passageways for loop-flushing. The end portions are pressurized with hydraulic fluid under high pressure on one side and with low pressure fluid on the other side. If the pressure difference between the high pressure side and the low pressure side is higher than a predefined second threshold value the shuttle valve spool is shifted in the flushing valve bore into an open position, in which a fluid passageway is open for fluidly connecting the low pressure inlet with the discharge outlet of the hydraulic fluid loop-flushing device. According to invention this takes place only if, at the same time, the pressure level at the low pressure side of the hydraulic system is higher than the value of the first threshold value predetermined for opening the flushing valve. Only if both threshold values are passed over, loop-flushing from the low pressure line to an area with low pressure in the hydraulic system is enabled, e.g. to the housing or a tank. The shuttle valve is designed such that the shuttle valve spool when shifted closes/disables loop-flushing at the high pressure side at the same time. Finally, flushing is enabled only by the inventive loop-flushing device if the pressure difference at the high pressure inlet and the low pressure inlet exceeds a second threshold value and, simultaneously, the low pressure exceeds a first threshold value for opening the flushing valve. Further simultaneously, the shuttle valve spool closes in an open position the fluid connection between the high pressure inlet and the discharge outlet.

Not only the oscillating opening and closing movements of the flushing valves known from the state of the art are avoided herewith, the inventive loop-flushing device is also reduced in size in comparison with the devices commonly known. For the inventive loop-flushing device only one valve cylinder or only one valve bore in a housing of a hydraulic apparatus is needed. Hence, the housing design for a hydraulic machine can be of reduced size. In a special embodiment, the inventive loop-flushing device can be mounted into the valve bore of existing shuttle valve bores. This is achieved for instance by the concentrical arrangement of the flushing valve spool and the shuttle valve spool, in particular when applying a cartridge design. With such an embodiment, already existing loop-flushing arrangements could be upgraded to an inventive loop-flushing device using e.g. the existing shuttle valve bore in the housing and disassembling the existing flushing valve.

Another advantage of the present inventive loop-flushing system is in that under normal operational conditions, only one control edge per pressure side is needed for enabling/disabling flushing. In such normal operational conditions of a hydraulic device or system the high pressure level as well as the low pressure level exceeds the first threshold value for opening pressure of the flushing valve and, simultaneously, the second threshold value for given for a required pressure difference between the high pressure side and the low pressure side is passed over.

In a further preferred embodiment the flushing valve operates in the manner of a safety relief valve, and reacts in critical system situations. If the low pressure is lower than the opening pressure of the flushing valve no flushing is enabled as the flushing valve spool is biased to its closed position by a flushing valve spring. In a further critical system situation, if the low pressure increases to a pressure level higher than a desired pressure level, then the flushing valve spool is shifted into another extreme position beyond the position in which the fluid channel is open, thereby closing the integrated fluid channel. With this embodiment of the inventive loop-flushing system it is possible to adjust a loop-flushing flow for a preferred pressure range of the low pressure. Preferably, this is the pressure range in which the hydraulic system works in normal operational conditions/states. Therewith, for the inventive loop flushing device a minimum pressure for enabling loop-flushing can be defined as easily as defining a maximum pressure when flushing should be disabled in order to prevent flushing at high pressure conditions, in which, e.g., loop-flushing would take out too much hydraulic fluid from the working circuit or loop flushing at an elevated low pressure level may elevate the risk of damaging the hydrostatic machine.

Furthermore, with the inventive loop-flushing system a fast reacting loop-flushing system is achieved, especially, with regard to changes in the operational conditions and the changes of pressure sides in a hydraulic system during operation of a hydraulic apparatus equipped with the inventive loop-flushing system. If the first threshold pressure level is exceeded on both pressure sides—at the low pressure side and the high pressure side—the flushing valves remain in their open positions and only the shuttle valve spool has to be brought/shifted into its correct open position for enabling a loop-flushing flow between the low pressure inlet and the discharge outlet. Hence, only the shuttle valve spool shifts if a change of the high pressure side occurs, in particular, if a change of operational mode (acceleration or deceleration) or the propel direction takes place.

In general, there are two constructive options for concentrically arranging the flushing valve spool and the shuttle valve spool according to the invention. First, the shuttle valve spool, respectively one of his end portion is housed in a flushing valve spool or both end portions of the shuttle valve spool are housed in flushing valve spools or, second, the shuttle valve spool houses the flushing valve spool or the flushing valve spools in a cartridge-like design. In both options the flushing valve spool remains in its open position when the pressure at one of the inlet ports of inventive loop-flushing system exceeds a first threshold value. If there is change of operational mode the shuttle valve spool shifts from one open position to the other open position, always enabling flushing solely between the low pressure inlet and the discharge outlet. In case the flushing valve spool encompasses the shuttle valve spool, the flushing valve—seen in direction of the flushing flow—is arranged before the shuttle valve. In case the flushing valve spool is integrated into the shuttle valve spool the flushing valve spool is arranged after the shuttle valve spool—again seen in direction of the flushing flow. In both cases neither the fluid flow passing the flushing valve spool's fluid channel nor the fluid flow passing shuttle valve spool's passage way influences the position of the valve spools relative to each other. Thus, pressure drops over the flushing valve spool or over the shuttle valve spool have no influence on the position of the respective other spool.

The design of a flushing valve according to the invention can also include an overpressure protection as already mentioned above, which will stop the flushing if the low pressure reaches a critical level. If flushing is enabled at high levels too much hydraulic fluid would be withdrawn from the hydrostatic system, additionally the same may be damaged by causing overpressure in areas designed for low pressure only. Nevertheless, high levels of low pressure could occur for a short time, if the change of high pressure from one working line to the other occurs rapidly, e.g. in oscillating working applications of a hydraulic system or device. With the inventive loop-flushing device it is possible to implement a "high pressure cut-off" at the low pressure side by designing the flushing-valve spool correspondingly. This and other aspects of the invention will be shown in detail in the description of the preferred embodiments. Thus, with the concentric arrangement of the flushing valve and the shuttle valve and its corresponding spools, not only a save and quick reacting loop-flushing device is provided, since also a loop flushing device is provided whose constructions space is reduced compared with the loop-flushing devices known from the state of the art. Heretofore, the inventive loop flushing device can be installed in housings of hydraulic apparatus like hydrostatic pumps or motors as well as into external (valve) housings guiding the loop-flushing fluid flow to e.g. a cooling system.

BRIEF DESCRIPTION OF THE DRAWINGS

In the following the inventive loop-flushing device will be shown in detail by the description of preferred embodiments. These preferred embodiments do not limit the inventive idea to these embodiments as could be seen easily by a person skilled in the art. The following Figures depicts exemplarily.

DETAILED DESCRIPTION

Figure 1:
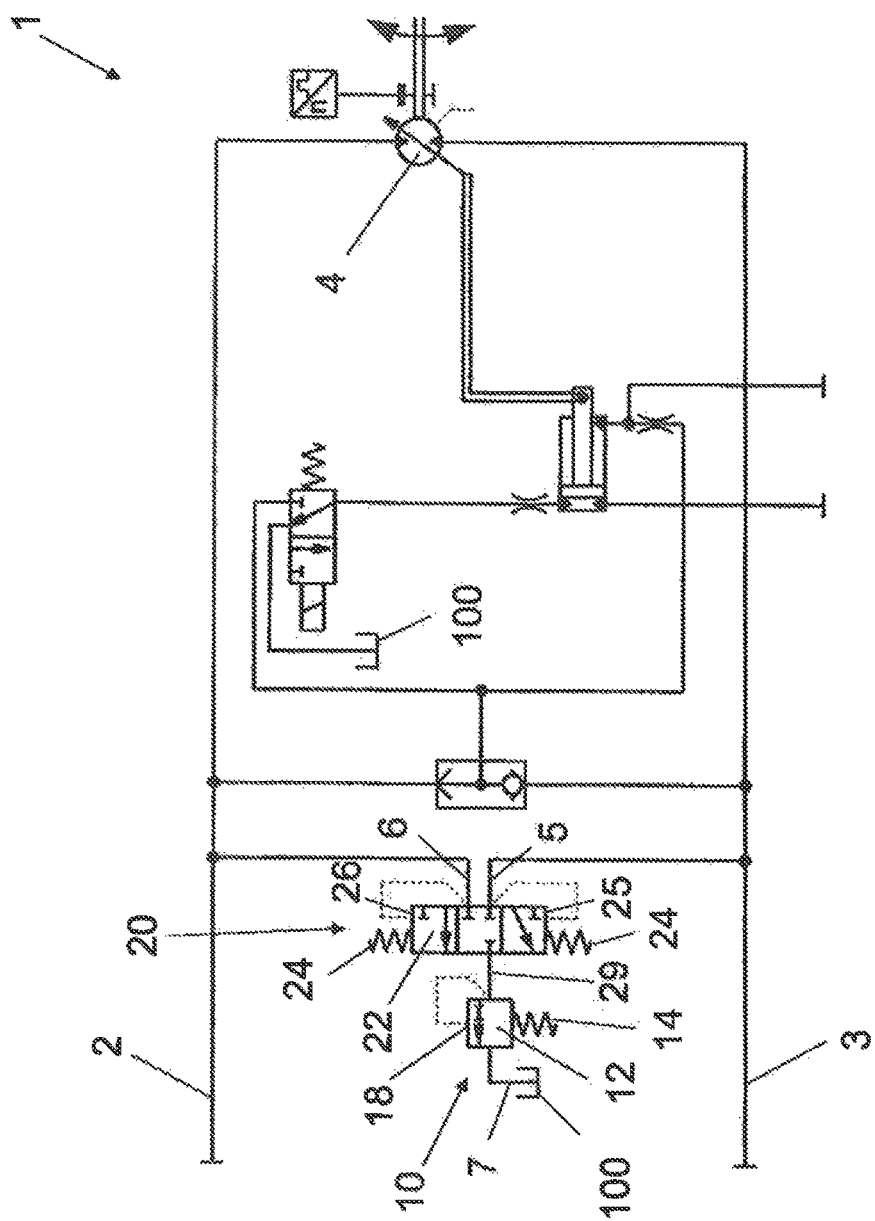
FIG. 1 is a schematic circuit diagram of a loop-flushing device according to the state of the art.

FIG. 1 depicts schematically in a circuit diagram a loop-flushing system known from the state of the art, e.g. the one the teaching of U.S. Pat. No. 6,430,923 B1 is starting from. In this system each of working lines 2 and 3 of a hydrostatic propel system is guided to one of sensing diameters 25 or 26 of a shuttle valve spool 22 of a shuttle valve 20. If the difference in pressure between the high pressure side and the low pressure side generates a pressure force on one of sensing dia-meters 25 or 26 being higher than the force of shuttle valve spring 24 being arranged on the opposite sensing diameter 26 or 25, shuttle valve spool 22 is shifted such that a fluid connection to passageway 29 is enabled for one of inlet port 5 or 6—being the inlet port for low pressure. The fluid pressure generated in this manner in passageway 29 is used to generate an opening pressure force against the force of flushing valve spring 14 on sensing surface 18 of flushing valve spool 12 of flushing valve 10. Hence, the value of the opening force depends on the fluid flow and fluid pressure passing shuttle valve 20. If, the pressure drop when opening flushing valve 10 ends up in a pressure in passageway 29 lower than the pressure needed to maintain flushing valve 10 open, flushing valve 10 closes until the pressure in passageway 29 raises again to a sufficient level to open flushing valve 10 again. Such an oscillating opening and closing does not only generate noises insinuating damages, since also disables proper loop-flushing at certain pressure conditions.

Figure 2:
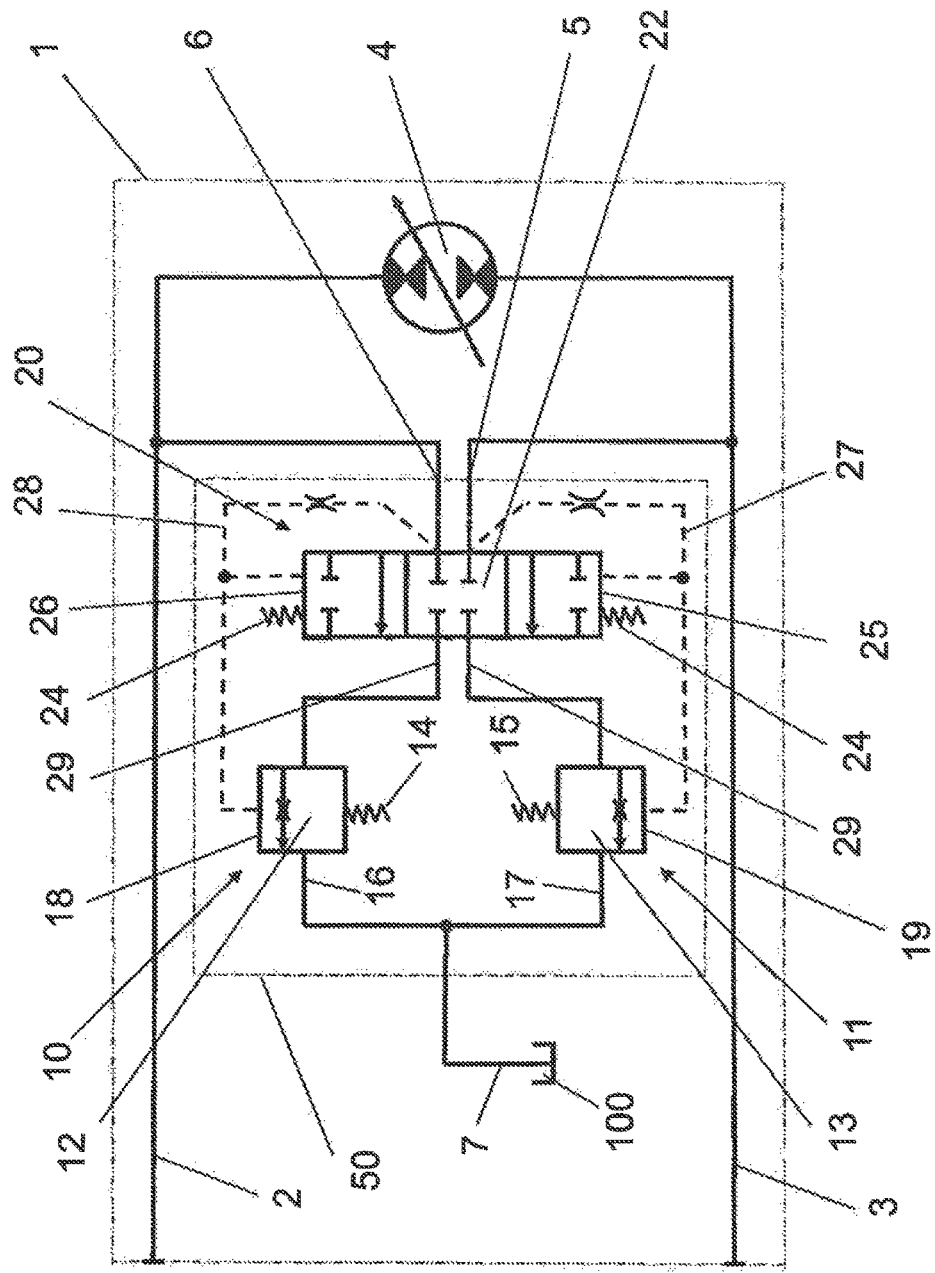
FIG. 2 is a schematic circuit diagram of the invention within a hydraulic system.

FIG. 2 shows a schematic hydrostatic diagram for loop-flushing according to the invention. For this Figure and the following Figures same parts are indicated with the same reference numerals.

A hydraulic system or apparatus 1, e.g. a hydrostatic pump or a hydrostatic motor with a rotational kit 4 is connected to working lines 2 and 3 providing the hydraulic driving mechanism, here a rotational kit 4 with hydraulic energy. Heretofore, one of pressure line 2 or pressure line 3 conducts hydraulic fluid with high pressure and the other pressure line conducts hydraulic fluid under low pressure, respectively. Details for controlling and steering the displacement of a hydrostatic unit, here the rotational kit 4, are omitted, as these details are commonly known by a person with ordinary skills in the art and are not relevant for the working principle of the inventive idea, on which the inventive loop-flushing device 50 is based on.

A shuttle valve 20 is connected via a pressure inlet port 5 and 6 with working lines 2 and 3. Depending on whichever working line 2 or 3 conducts hydraulic fluid under high pressure, one of inlet port 5 or 6 guides hydraulic fluid under high pressure to a valve bore 9 (see FIGS. 4-10 or FIG. 12). Hence, the other one is an inlet port for low pressure. Shuttle valve spool 22 of shuttle valve 20 is hold by two shuttle valves springs 24 elastically prestressed in its initial centered position in the valve bore. In the initial position of the shuttle valve 22 no fluid flow over shuttle valve 20 is possible as passageways 29 of shuttle valve 22 are closed. The sensing diameters 25 and 26 of the shuttle valve spool 22 are fluidly connected with the inlet ports 5 and 6 via connection lines 27 and 28 guiding pressurized fluid from the inlet ports 5 and 6 to sensing diameters 25 and 26.

In operation of the hydraulic device 1 according to FIG. 2 one of working line 2 or 3 is conducts hydraulic fluid under high pressure. If working line 2 is supposed to be conducting hydraulic fluid under high pressure then inlet port 6 of shuttle valve 20 is connected to the high pressure side of hydraulic device 1 and hydraulic fluid under high pressure acts via connection line 28 on sensing diameter 26 of the shuttle valve spool 22, correspondingly. On the other hand pressure inlet port 5 is connected to the low pressure side of hydraulic device 1 and, correspondingly, connecting line 27 conducts hydraulic fluid under low pressure to sensing diameter 25 of the shuttle valve spool 22. Preferably, connection lines 27 and 28 are designed as to have a throttle effect or such that throttle valves are arranged within the same in order to reduce the pressure from the pressure inlet ports 5, 6 before acting on sensing diameters 25 or 26 of the shuttle valve spool 22.

Going on with the above supposed example in which working line 2 conducts hydraulic fluid under high pressure. Consequently, pressure inlet 6 of the shuttle valve 20 is under high pressure and shuttle valve spool 22 will be shifted if the high pressure acting on sensing diameter 26 of the shuttle valve spool 22 generates a hydraulic force bigger than the spring force of shuttle valve spring 24 being arranged on the opposite sensing diameter 25 and the low pressure hydraulic force acting thereon as well, being generated by the hydraulic pressure guided from inlet port 5 via connection line 27 to sensing diameter 25. The hydraulic force acting on sensing diameter 25 is generated by hydraulic fluid under low pressure. According to the supposed situation and with reference to FIG. 2 shuttle valve spool 22 is shifted downwards if the conditions mentioned before are present. Accordingly, hydraulic fluid is guided to flushing valve 11 which is shown in the lower part of the schematic inventive loop-flushing device 50 depicted in FIG. 1.

As easily could be seen by a person skilled in the art, shuttle valve spool 22 is shifted upwards if the operational mode of hydraulic device 1 is changed so that working line 3 is the working line conducting hydraulic fluid guiding high pressure. Then a fluid connection from inlet port 6—the new low pressure inlet port—to the second flushing valve 10 is enabled.

The two flushing valves 10, 11 shown in FIG. 2 comprise each a flushing valve spool 12, 13, respectively, which are hold in their initial closed positions by flushing valve springs 14 and 15. As can be seen further in FIG. 2 connection lines 27 and 28 guides hydraulic fluid directly from the inlet ports 5, 6 at the same pressure level to the sensing surfaces 18, 19 of flushing valve spools 12, 13 as it is the case for the pressure level acting on sensing diameters 25, 26 of the shuttle valve spool 22. Hereby, sensing surfaces 18, 19 are being opposite to respective flushing valve springs 14, 15, consequently, the closing forces of the flushing valve springs 14, 15 determine the opening pressures for flushing valves 10 and 11, respectively. These opening pressures define a first threshold pressure value for opening and closing of the flushing valves 10 and 11. Hereby, a person skilled in the art contemplates that the opening pressure could be initially, or as well dynamically, adjustable or adaptable according to operational conditions if desired; by simply adjusting the biasing force of flushing valve springs 14, 15. The same applies to the possibility that the two opening pressures for the two flushing valves 10, 11 could be set to independently different threshold pressure values and to the possibility for setting different flushing flow volumes passing the flushing valves 10,11. The later can be achieved as well by the application of different sizes of flushing flow cross sections over flushing valves 10 and 11.

If the pressure in one or both of connection lines 27 and 28 is higher than the threshold pressure defined by the corresponding flushing valve 10 or 11 the same aforementioned pressure level enables a fluid flow from shuttle valve 20 to a discharge outlet 7 of the inventive loop flushing device 50. The opening pressure of the corresponding flushing valve 10, 11, i.e. the minimum force to shift the flushing valve spool 12, 13, respectively, is thereby determined by the strength of flushing valve springs 14 or 15 defining also the threshold opening pressure value for each flushing valve 10, 11. Consequently, both flushing valves 10, 11 are open if in normal operation of hydraulic device 1 the pressure at the low pressure side exceeds the predetermined first threshold value pressure level.

As further could be seen in FIG. 2 no fluid flushing from the low pressure inlet port to the discharge outlet 7 occurs, if the shuttle valve spool 22 is in its initial centered position. The shuttle valve spool 22 is shifted into one of its two possible eccentric open positions when the difference of pressures acting on both sensing diameters 25 and 26 exceeds a predefined second threshold value. This second threshold value is determined by the shuttle valve springs 24 as their forces must be overcome in order to shift shuttle valve spool 22 in one of its eccentric positions. If the shuttle valve springs 24 are adjustable, then the second threshold value is also adjustable.

Figure 3:
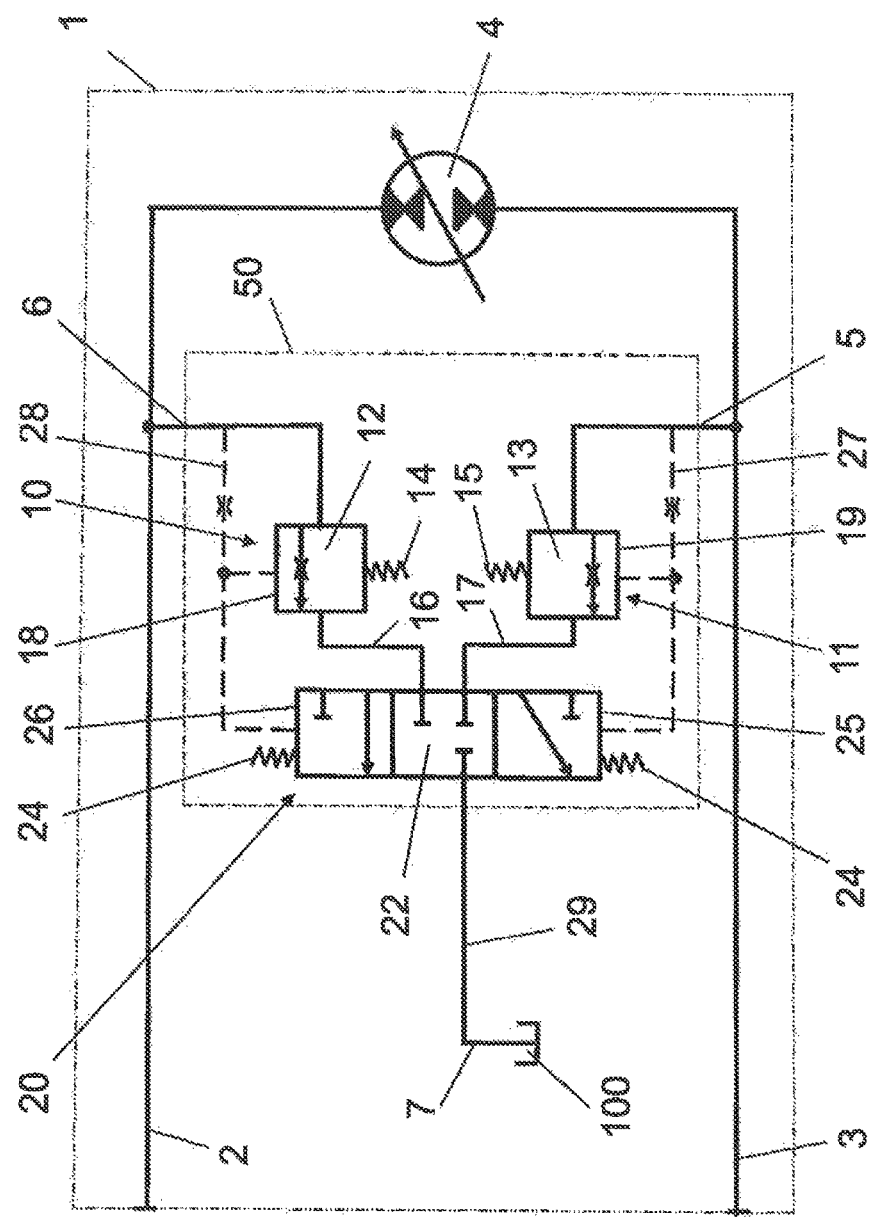
FIG. 3 is another schematic circuit diagram for the arrangement of the inventive loop-flushing device in a hydraulic system.

In the embodiment shown in FIG. 2 the two flushing valves 10, 11 are arranged downstream of the shuttle valve 20 in direction of flow of the fluid being flushed by the inventive loop-flushing device 50. Different to the embodiment shown in FIG. 2 the embodiment of FIG. 3 shows an arrangement of the two flushing valves 10, 11 being arranged upstream of the shuttle valve 20. Supposing again that working line 2 guides hydraulic fluid under high pressure the fluid pressure in connection line 28 opens the first flushing valve 10 if the pressure on sensing surface 18 of the flushing valve spool 12 is high enough to traverse the elastic forces of flushing valve spring 14. The same applies for flushing valve 11 if the low pressure at inlet port 5 passes the pressure level defined by the first predetermined threshold value corresponding to the strength of flushing valve spring 15.

If, according to the embodiment shown in FIG. 3, one or both pressures present at the pressure inlets 5 or 6 is/are high enough to open one flushing valve 10 or 11, hydraulic fluid could flow to shuttle valve 20. In FIG. 3 the shuttle valve 20 is depicted again in its initial position, in which fluid flow over shuttle valve 20 is disabled. Fluid flow over the shuttle valve 20 will be enabled when the hydraulic pressure forces on sensing diameters 25 or 26 are of different height and, simultaneously, the resulting hydraulic pressure force is high enough to overcome the elastic force of one of shuttle valve springs 24. Following the supposed initial example in which working line 2 conducts hydraulic fluid under high pressure, sensing diameter 26 is pressurized by high pressure. Consequently, shuttle valve spool 22 again is shifted downwards in the plane of projection of FIG. 3. This means in other words that hydraulic fluid entering the inventive loop-flushing device 50 at inlet port 5 is guided/flushed over the lower flushing valve 11 and shuttle valve 20 in its "lower position" to discharge hydraulic fluid over outlet 7, exemplarily to a tank 100 or to a motor case (not shown).

Figure 4:
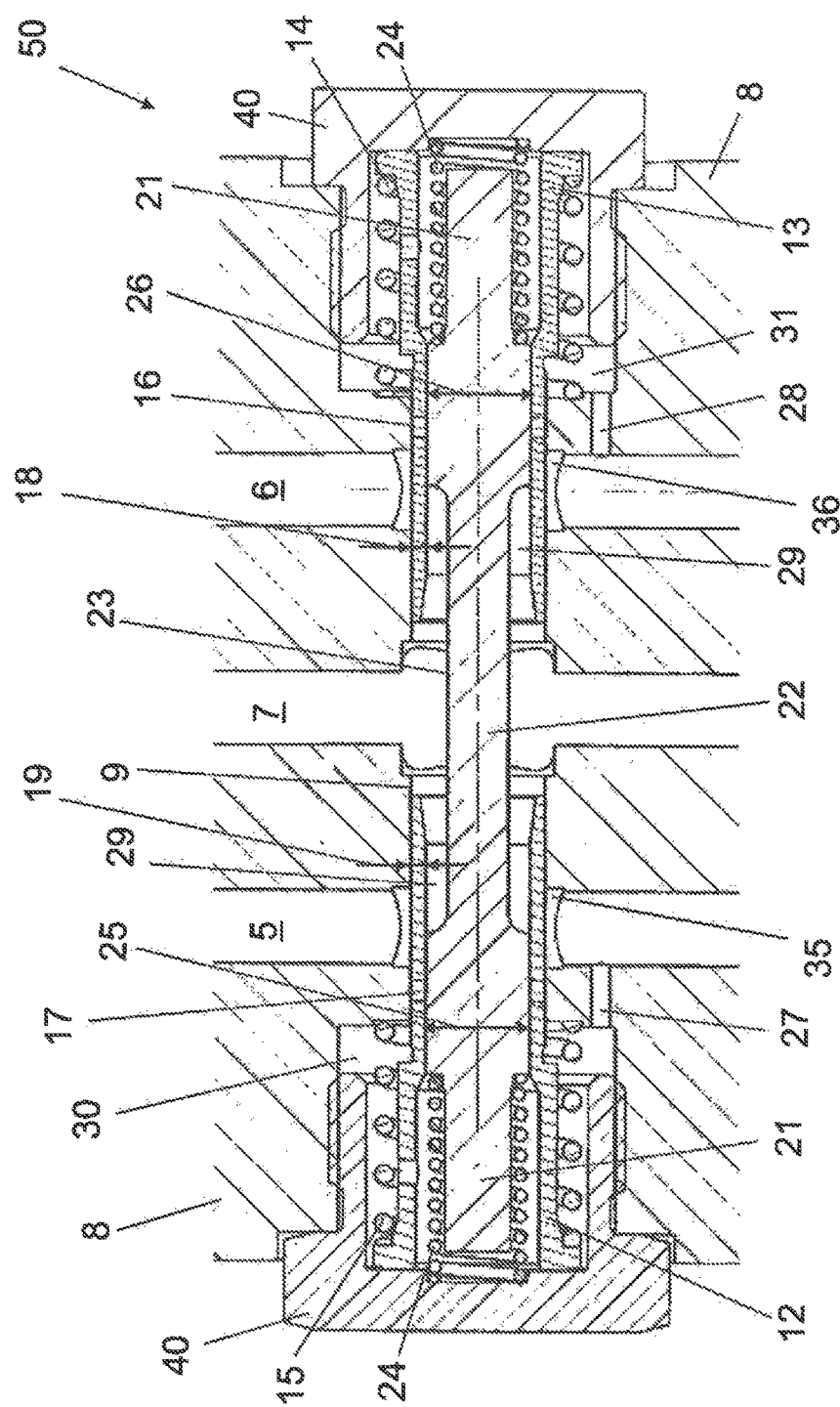
FIG. 4 schematically shows a section view of a first preferred embodiment of the inventive loop flushing device according to FIG. 3 in an initial condition.

FIG. 4 shows a sectional view of a further preferred embodiment of the inventive loop-flushing device 50. The loop-flushing device 50 shown in FIG. 4 is in its pressure-less, initial position, in which the shuttle valve spool 22 is centered by two shuttle valve springs 24. For this, shuttle valve springs 24 abut against end caps 40 screwed into distal ends of valve bore 9 of housing 8 of the inventive loop-flushing device 50. Concentrically around valve spool 22 flushing valve spools 12 and 13 are arranged on end portions 21 of shuttle valve spool 22. In the pressure-less initial state of the loop-flushing device 50 the flushing valve spools 12 and 13 also abuts against end caps 40. Flushing valve springs 14 and 15 bias the flushing valve spools 12 and 13 elastically against these end caps 40 such that the sensing surfaces 18 and 19 of the flushing valve spools 12, 13 also abuts against end caps 40. The two pressure inlets 5 and 6 are connected via connection lines 27 and 28 to sensing chambers 30 and 31. The pressure being present in the sensing chambers 30 and 31 correspond to the pressure at the connected inlet port 5 or 6. Eventually, the hydraulic pressure in the sensing chambers is reduced due to the diameter of connection lines 27 and 28 acting as throttle valves to prevented overpressure in the sensing chambers 30 and 31.

In the initial position of the inventive loop-flushing device 50 fluid channels 16 and 17 in the flushing valve spools 12 and 13 being, in this preferred embodiment, radial oriented orifices are being closed by the shuttle valve spool 22. Further on, these orifices 16 and 17 are not in fluid connections with the correspondent pressure inlets 5 and 6 because flushing valve springs 14 and 15 cause the flushing valve spools 12 and 13 to abut against the end caps 40. The flushing valve spools 12, 13 shown in FIG. 4 are situated in their correspondent closed position as no pressure or pressure not high enough act on sensing surfaces 18 and 19 of flushing valve spools 12 and 13. The pressure-less shuttle valve spool 22 is also situated in his closed position being axially centered in valve bore 9.

Figure 5:
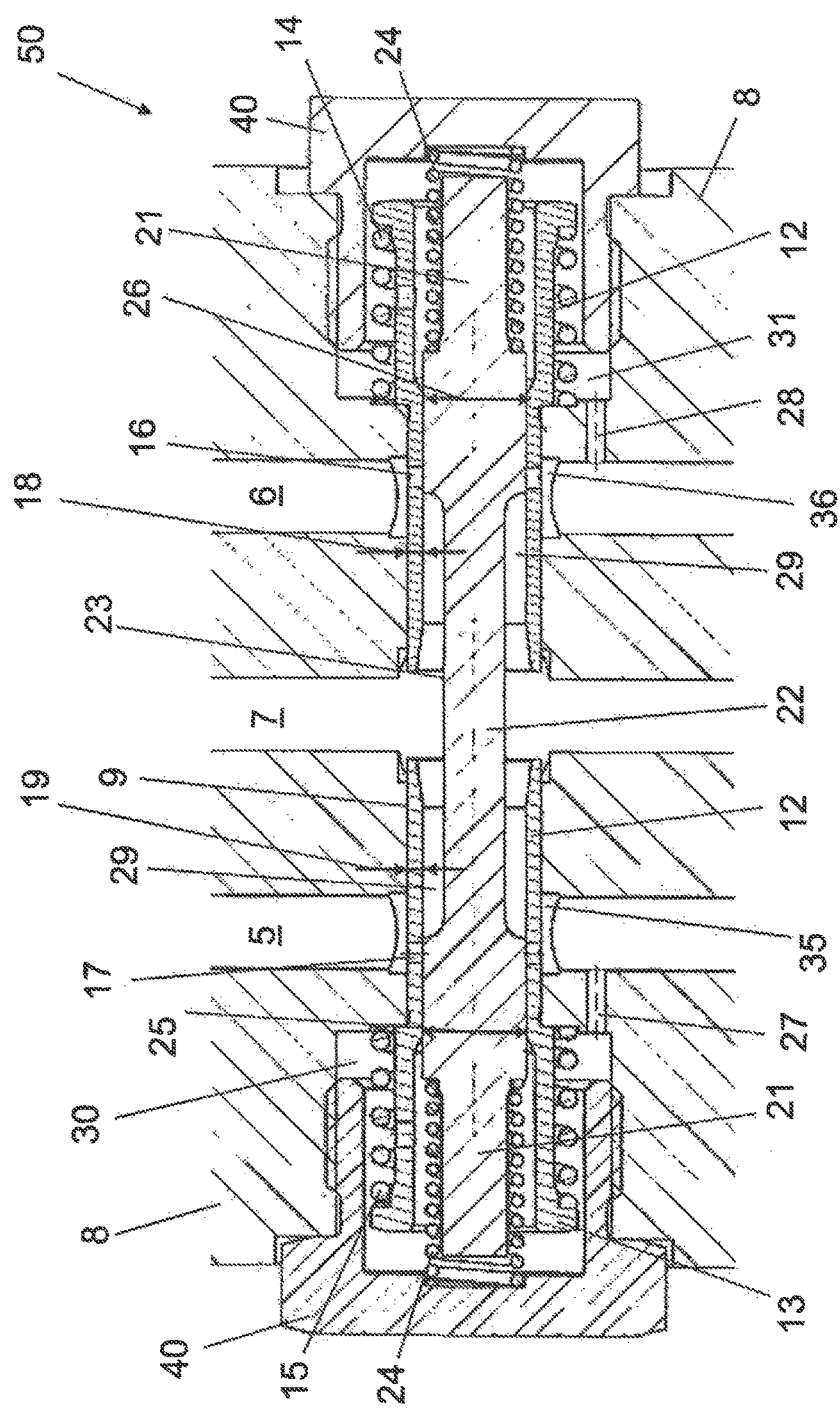
FIG. 5 illustrates the embodiment of FIG. 4 in a first operational condition.

FIG. 5 shows the inventive loop-flushing device 50 in an first operational state in which the flushing valve spools 12 and 13 are shifted into the open positions in which the fluid channels 16 and 17 are in fluid connection with the correspondent pressure inlets 5 and 6, respectively are in fluid connection with circumferential grooves 35 and 36 provided for circumferentially supplying hydraulic fluid to a plurality of fluid channels 16 and 17 arranged on the circumference of flushing valve spool 12 and 13, respectively. Circumferential grooves 35 and 36 can also be used to provide/bypass hydraulic fluid to another consumer, e.g. a control device for the hydraulic apparatus. In this state, shown in FIG. 5, the pressures in the two sensing chambers 30 and 31 are high enough to compress flushing valve springs 14 and 15 by generating a pressure forces on sensing surfaces 18 and 19 of the flushing valve spools 12 and 13. Thereby, the hydraulic forces on the sensing surfaces 18 and 19 of the flushing valve spools 12 and 13 are being higher than the elastic forces generated by flushing valve springs 14 and 15. The situation shown in FIG. 5 depicts also that the pressure difference in the two sensing chambers 30 and 31 is lower than a second threshold value. If the pressure difference in the two sensing chambers 30 and 31 would be higher than the second threshold value the shuttle valve spool 22 would be shifted towards the one end cap 40 arranged at the sensing chamber with lower pressure. This means that the forces generated by the pressure in the sensing chambers 30 and 31 could be, according to the example in FIG. 4, also be equal, thus their difference is not high enough to shift shuttle valve spool 22 out of its centered position. This situation exemplarily occurs e.g. in an idle state of a hydraulic propel device.

Figure 6:
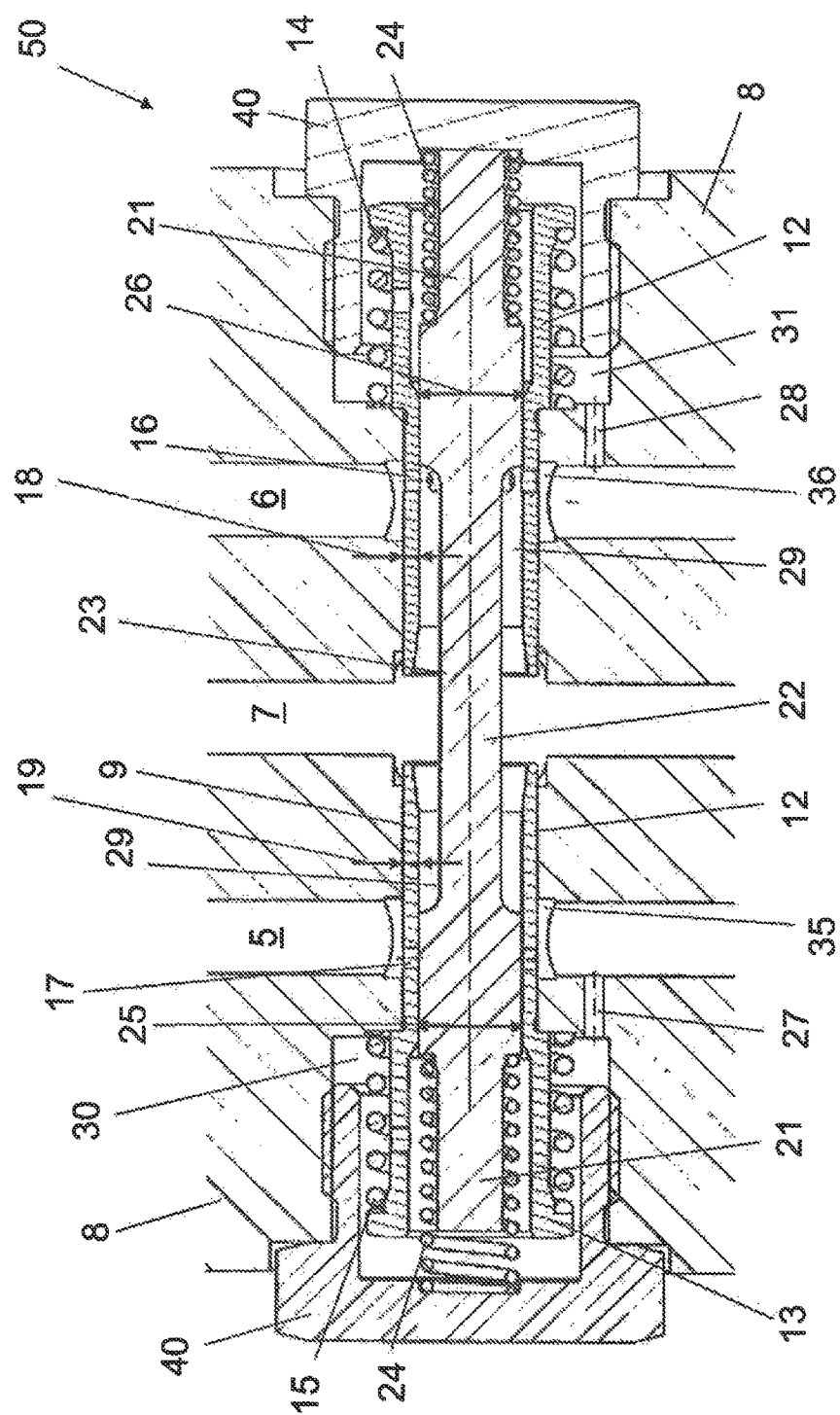
FIG. 6 illustrates the embodiment of FIG. 4 in a second operational condition.

In FIG. 6 another state of the inventive loop-flushing device 50 is shown, in which the flushing valve spools 12, 13 continuing in their respective open positions, but shuttle valve spool 22 being situated in one of its two open positions. Here, shuttle valve spool 22 is shifted to the right in sense of the drawing plane of FIG. 6. In this state the pressure difference of sensing chambers 30 and 31 exceeds the second threshold value. With a pressure difference equal or higher than the second threshold value, the pressure force generated by the hydraulic pressure on the high pressure side of the inventive loop-flushing device 50—here in sensing chamber 30—on the sensing diameter 25 of shuttle valve spool 22 is higher than the sum of the counterforces generated by the shuttle valve spring 24 arranged on the opposite side of shuttle valve spool 22 in sensing chamber 31, i.e. on the low pressure side, and by the pressure force generated on sensing diameter 26 by the low pressure in sensing chamber 31.

From FIG. 6 it can be seen that fluid connection between the low pressure inlet 6 and the discharge outlet 7 is open as the shuttle valve spool 22 is shifted until its physical stop at end cap 40. Loop-flushing is enabled from the low pressure inlet 6 via orifices 17 forming a hydraulic channel in flushing valve spool 12. From the orifices 17 hydraulic fluid can flow over passage way 29 formed on the mid portion 23 of shuttle valve spool 22 towards discharge outlet 7. Passage way 29 is formed on the mid portion 23 of shuttle valve spool 22 exemplarily by a reduced diameter portion. So, components of the hydraulic propel device 1 which have to be lubricated or cooled can be passed by the enabled hydraulic fluid flow which can be drained further on to a fluid cooler, the device casing or a tank 100.

Figure 7:
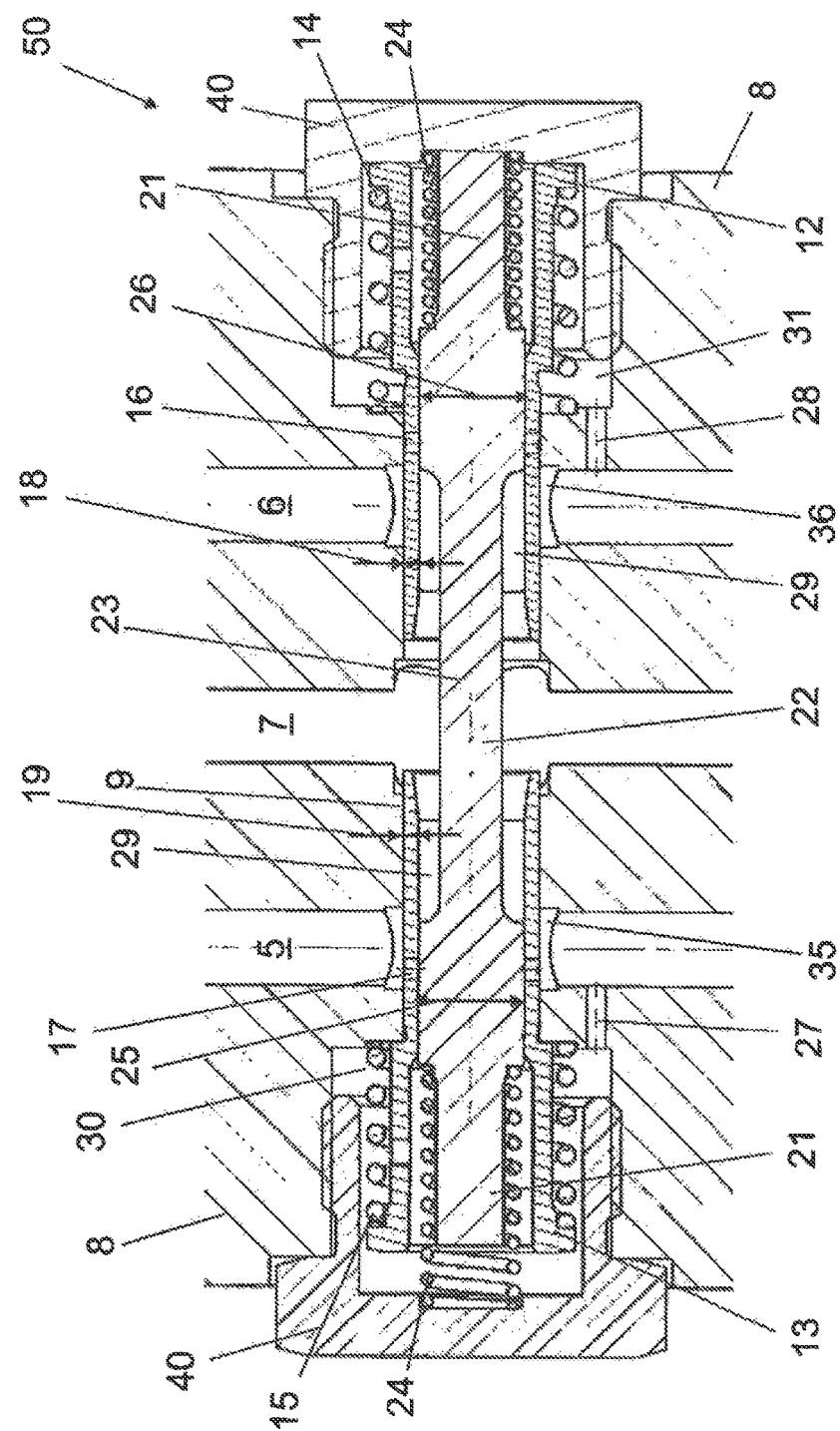
FIG. 7 illustrates the embodiment of FIG. 4 in a third operational condition.

FIG. 7 shows another possible operational state of the inventive loop-flushing device 50 in which only one flushing valve spool is situated in its open position namely the flushing valve spool 13 being arranged on the high pressure side of the hydraulic device 1 and hence on the left side in FIG. 7. The other flushing valve spool 12—the one shown on the right side of FIG. 7—being hydraulically connected on the low pressure side is in its closed position, in which the fluid channel 17 is not fluidly connected with low pressure inlet 6 of the inventive loop flushing device 50. Such a situation exemplarily occurs if the low pressure does not show a level high enough to generate a hydraulic pressure force on the sensing surface 18 of the flushing valve spool 12 which enables shifting of the flushing valve spool 12 against the force of valve spring 14 into the opening position. In this situation the pressure in the sensing chamber 31 at the low pressure side of the loop flushing device 50 is below the first predefined threshold value. Such a situation occurs for instance if an emergency stop for a work machine is required or if on the low pressure side no or too little pressure can be generated, for example due to a pressure dependent defect on or in the low pressure line.

Figure 8A:
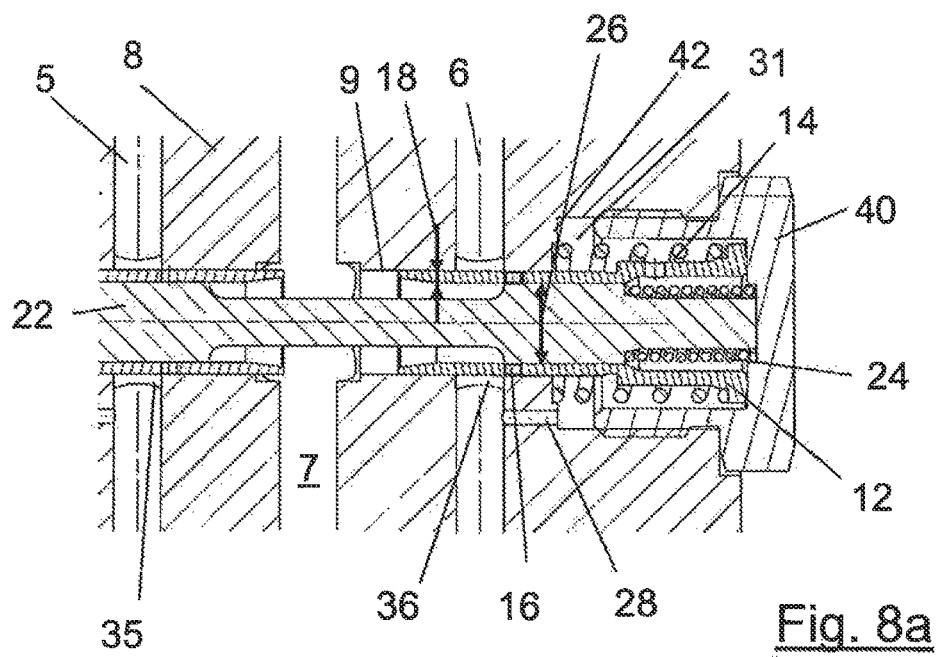
FIGS. 8a-8c schematically show a second preferred embodiment of the inventive loop-flushing device with a flushing valve usable as pressure relief valve.
Figure 8B:
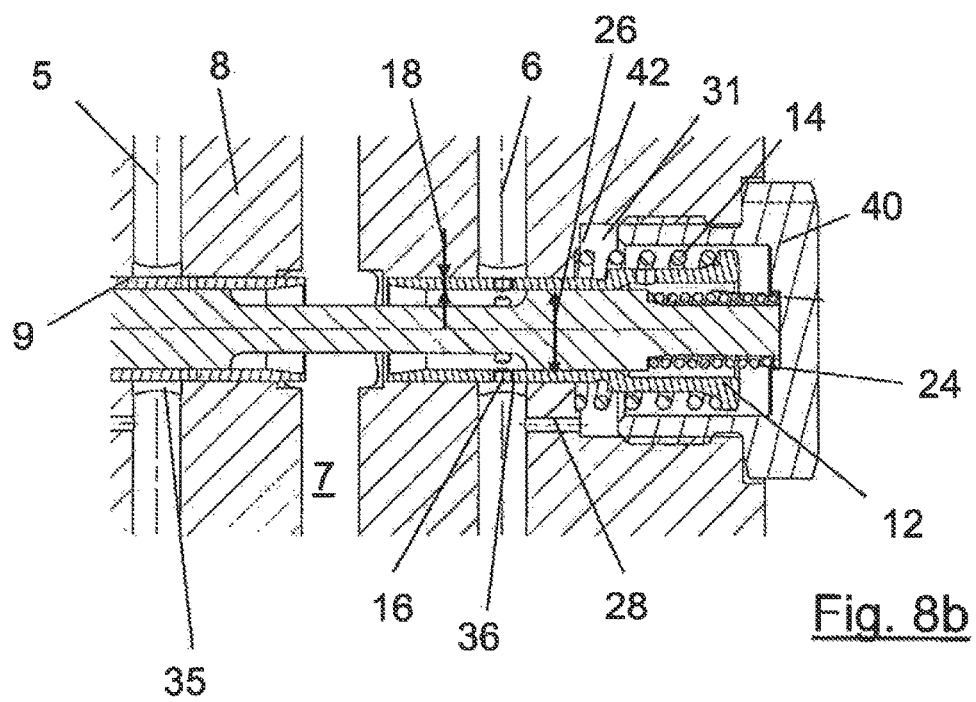
Figure 8C:
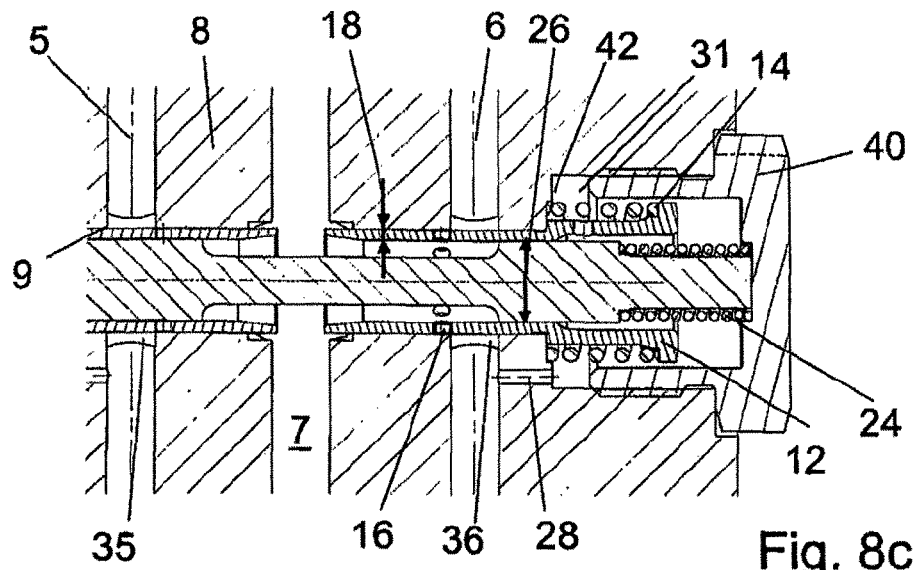

In FIGS. 8a to 8c a further embodiment of the inventive loop-flushing device is shown whereas only a sectional view of one side of the inventive loop-flushing device 50 is shown. Hereby, the flushing valve spool 12 of the low pressure side of hydraulic device 1 is shown with the correspondent low pressure inlet 6 arranged in valve housing 8. In FIG. 8a the flushing valve spool 12 is brought into its closed position by flushing valve spring 14, what means that the pressure in sensing chamber 31 on the low pressure side of the inventive loop flushing device 50 is lower than the first threshold value. With a look to FIG. 10, in which a diagram for spool stroke over hydraulic pressure is shown, it can be seen that until the first threshold value is not reached in sensing chamber 31 the spool stroke of flushing valve spool 12 is equal to zero. In case the threshold value on the low pressure side exceeds the first threshold value flushing valve spool 12 is shifted against flushing valve spring 14 into an open position, where orifice 16 is in fluid connection with low pressure inlet 6 (see FIG. 8b). Turning again to FIG. 10 it can be seen that the valve stroke is increasing correspondingly with the increase of pressure in sensing chamber 31. If the pressure in sensing chamber 31 reaches a third threshold value for the low pressure, orifice 16 does not overlap low pressure inlet 6 anymore and therefore no fluid flow over orifice 16 is possible see FIG. 8c). Simultaneously, flushing valve spool 12 abuts on a shoulder 42 of a housing 8 exemplarily formed inside sensing chamber 31. Accordingly, in FIG. 10 the spool stroke remains constant; however, the pressure at the low pressure side rises. With the hatched area in FIG. 10 the stroke area of flushing valve spool 12 it is shown that hydraulic loop flushing from the low pressure side to the discharge port 7 is enabled only if the pressure difference between the high pressure side and the low pressure side in the inventive loop flushing device 50 is high enough to bring shuttle valve spool 22 into the corresponding open position at the low pressure side.

Figure 9:
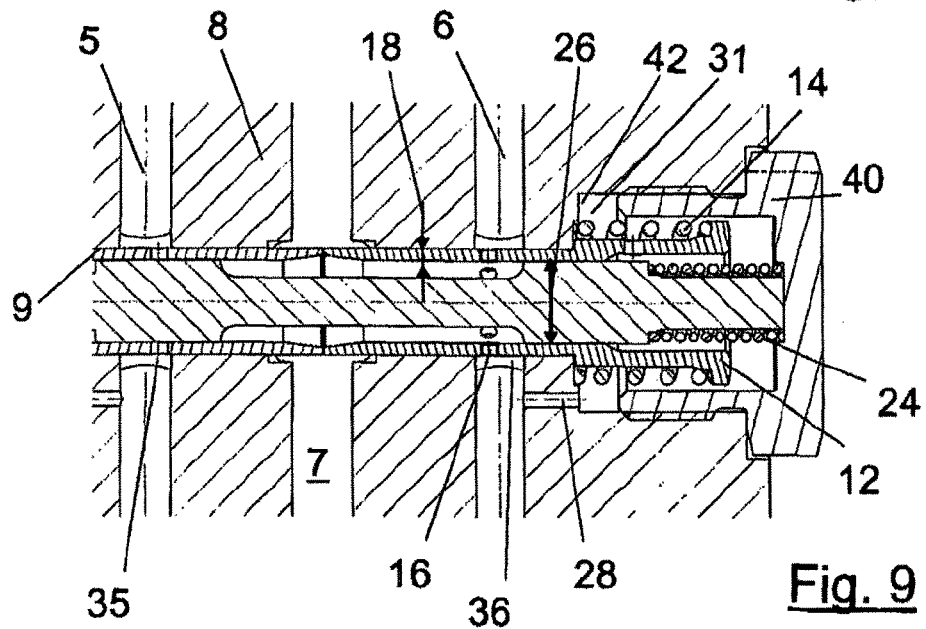
FIG. 9 schematically shows an alternative embodiment to the one according to FIGS. 8a-8c.
Figure 10:
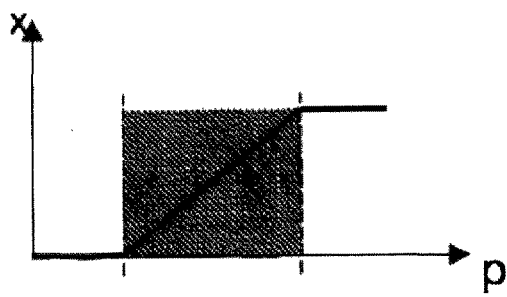
FIG. 10 is a schematic diagram for loop-flushing conditions according to the embodiments of FIGS. 8a-8c and FIG. 9.

Another preferred embodiment for stopping fluid flushing over the inventive loop-flushing device 50 if a low pressure level is too high for damage-free loop-flushing is shown in FIG. 9. In this embodiment flushing valve spool 12 on the low pressure side abuts against flushing valve spool 13 on the high pressure side, if the low pressure reaches a third threshold value. Deviating from the embodiment shown in FIG. 8c, in this embodiment the two spool shafts of the two flushing valve spools 12 and 13 abuts against to each other, in order to make passageway 29 fluid-tight towards discharge outlet 7 and to prevent loss of hydraulic fluid at high pressures.

Figure 11:
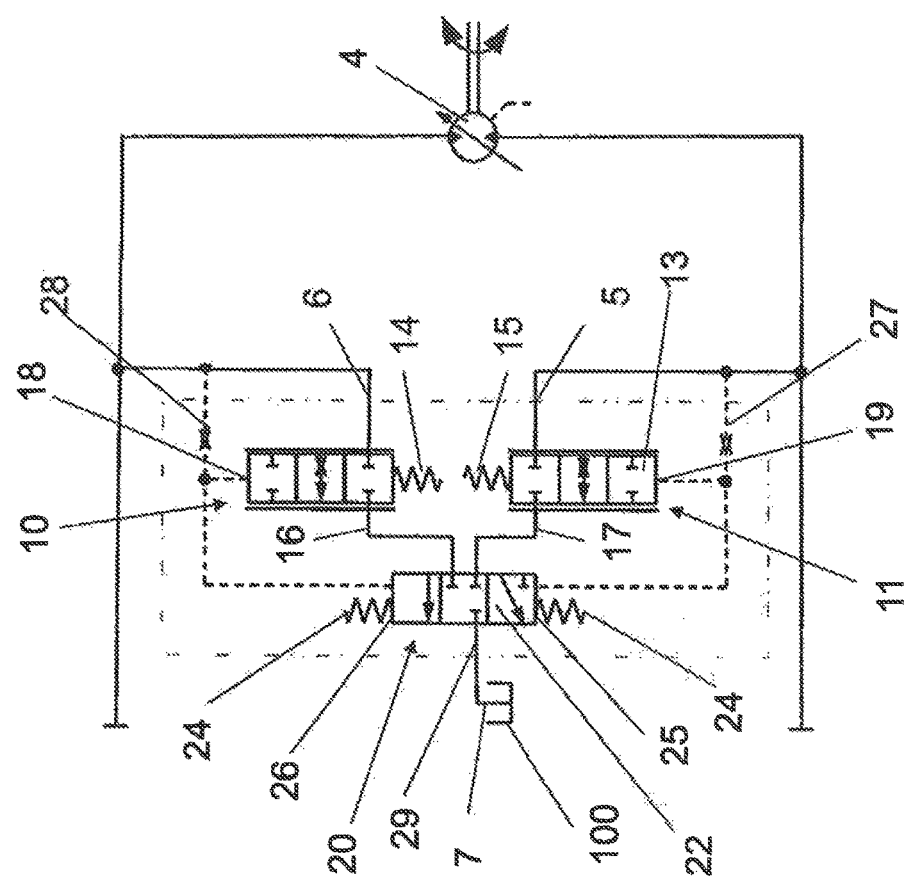
FIG. 11 is a schematic circuit diagram for the second preferred embodiment shown in FIGS. 8a-8c and FIG. 9.

The schematic circuit diagram of FIG. 11 shows in an abstract manner the working principle of the embodiments depicted in FIGS. 8a-8c and FIG. 9. Consequently, the flushing valves 10 and 11 are shown as 2-way-3-position proportional valves, whose actuating force is generated by the fluid pressure in the connection lines 27 and 28, respectively.

Figure 12:
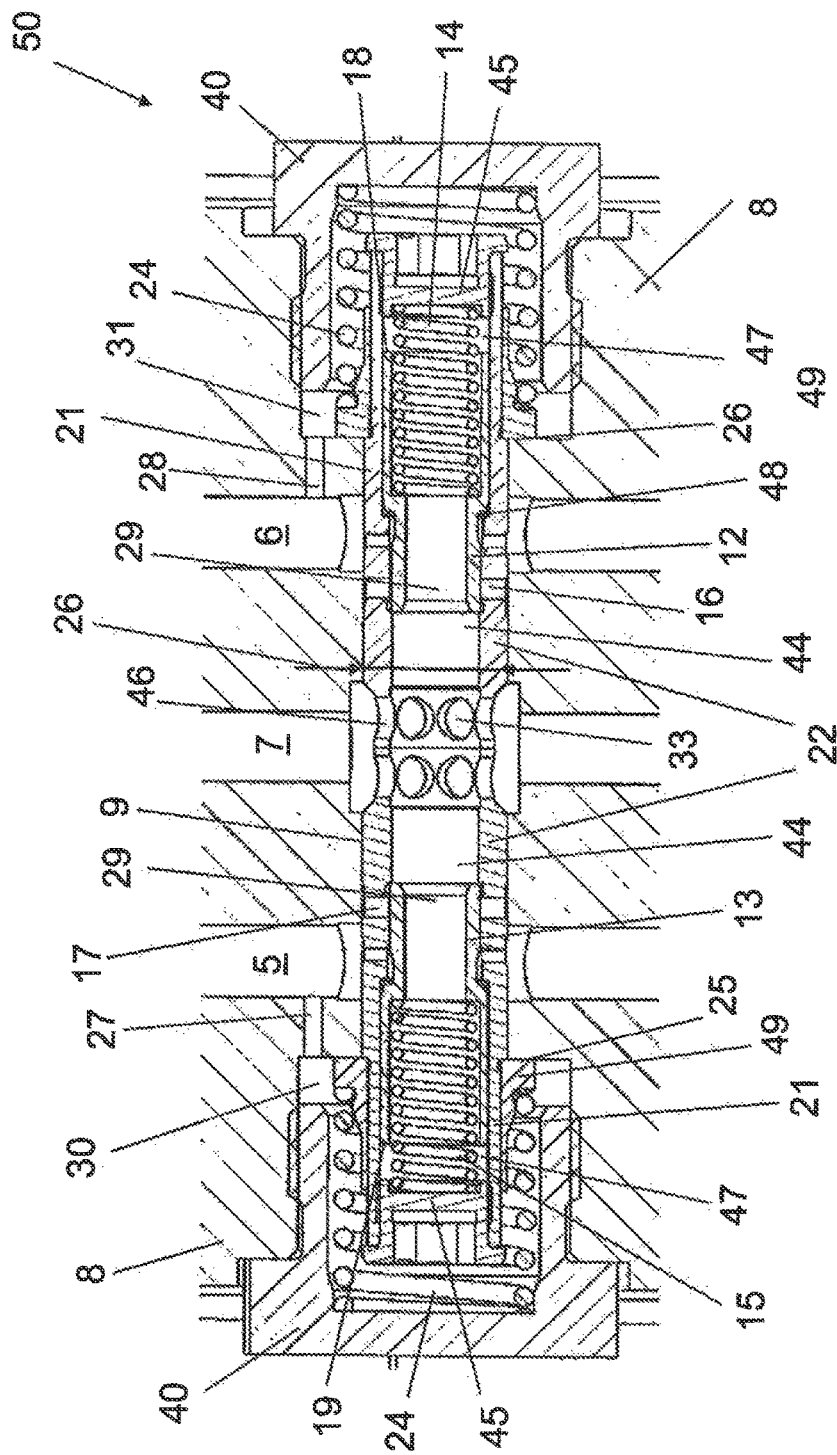
FIG. 12 schematically shows a further preferred embodiment of the inventive loop-flushing device according to the schematic diagram of FIG. 2 as cartridge design.

With FIG. 12 a further preferred embodiment of the inventive loop-flushing device 50 is shown. With difference to the embodiments shown in FIGS. 3 to 9 the embodiment of FIG. 12 shows the flushing valve spools 12 and 13 arranged inside a longitudinal bore 44 of shuttle valve spool 22. This embodiment corresponds to the schematic circuit diagram of FIG. 2, as the flushing valves 10 and 11 are arranged—hydraulically seen in the direction of possible loop-flushing—behind the shuttle valve 20. The shown arrangement is also in the so called cartridge design, as the bigger—part here the shuttle valve spool 22—receives the flushing valve spools 12 and 13. As indicated above common parts to the former embodiments receive the same reference numerals for easier identification. As the general functioning of the inventive loop-flushing device 50 was already explained in detail with describing FIGS. 2 to 6, only the differences with regard to FIG. 12 should be explained.

The shuttle valve spool 22 shown in FIG. 12 maybe composed of a two-part shuttle valve spool 22, whereas the two—preferably symmetric—parts of the valve spool 22 contacts each other at the outlet port 7. Thereby, the shuttle valve spools 22 having a general shape of a bushing. The passageways 29 of shuttle valve spools 22 are built as radial oriented orifices arranged in the medial end portions 46 of the shuttle valve spools 22. According to the embodiment shown in FIG. 12, in the shafts of shuttle valve spools 22 through-holes 33 are arranged such that pressurized fluid from the high pressure inlet 5 or 6 or the low pressure inlet 6 or 5 can act as hydraulic forces on ring-shaped 48 areas formed on the flushing valve spools 12 and 13. This pressure forces are directed to enable shifting of the flushing valve spools 12 and 13 into their open position against flushing valve springs 14 and 15 which abut against flushing end caps 45. These flushing end caps 45 are preferably screwed in the distal end portions 21 of shuttle valve spools 22. Between the flushing end caps 45 and the flushing valve spool 12, 13 a gap 47 is formed, if the flushing valve spools 12 and 13 are in its closed (initial) position as shown in FIG. 8. When the hydraulic pressure is rising at one of the pressure inlets 5 or 6 or at both, pressurized fluid is acting on ring surface 48 of flushing valve spools 12 or 13 thereby generating a counterforce against the force of flushing valve springs 14 and 15, closing gap 47 and, simultaneously, opening a passage way 29 by shifting flushing valve spool 12 or 13 inside the longitudinal bores 44 of shuttle valve spools 22. In the embodiment of FIG. 12 passage way 29 for enabling loop-flushing from the low pressure side to discharge outlet 7 is arranged inside the shuttle valve spool 22. Contrary to the embodiments shown in FIGS. 2 to 9 the shuttle valve spool 22 is moved to its open position by a pressure force on end face 25 on a nut 49 fixed on the circumferential outside of shuttle valve spool 22, moving the shuttle valve spool away from the discharge port 6 towards end cap 40 of valve bore 9. Nuts 49 are elastically pre stressed by shuttle valve springs 24 such that shuttle valve springs 24 center shuttle valve spool 22 in valve bore 9 via nuts 49, if the inventive loop-flushing device 50 is in its initial condition, i.e. pressure-less.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic fluid loop-flushing device for a hydrostatic apparatus comprising:
    a valve housing having a cylindrical valve bore with a first inlet, a second inlet and a discharge outlet,
    a first flushing valve spool arranged elastically pre-stressed within the valve bore for enabling a fluid connection between the second inlet and the discharge outlet by means of a first fluid channel, the first flushing valve spool arranged with a first flushing valve spring,
    a second flushing valve spool having a second fluid channel for enabling a fluid connection between the first inlet and the discharge outlet, the second flushing valve spool arranged with a second flushing valve spring,
    a shuttle valve spool arranged elastically pre-stressed within the valve bore for enabling the fluid connection between the second inlet and the discharge outlet by means of a fluid passageway, wherein the first flushing valve spool is moveable into an open position, in which the first fluid channel is open, if the fluid pressure at the second inlet exceeds a first threshold value, wherein the shuttle valve spool is moveable into an open position, in which the fluid passageway is open for connecting the second inlet with the discharge outlet, if the pressure difference between the first inlet and the second inlet exceeds a second threshold value, wherein the first flushing valve spool and the shuttle valve spool are arranged concentrically and moveable relative to each other, wherein the first flushing valve spring biases the first flushing valve spool independently of the shuttle valve spool and the second flushing valve spring biases the second flushing valve spool independently of the shuttle valve spool, and wherein the fluid connection between the second inlet and the discharge outlet is enabled only if both the first flushing valve spool and the shuttle valve spool are in the respective open positions.

2. The loop-flushing device according to claim 1, wherein the shuttle valve spool is symmetrically formed, and wherein the first flushing valve spool and wherein the second flushing valve spool are arranged on each end portion of the shuttle valve spool, and wherein the fluid passageway is arranged in the central portion of the shuttle valve spool.

3. The loop-flushing device according to claim 2, in which the first flushing valve spool has a general shape of a bushing, within which at least one end portion of the shuttle valve spool is arranged concentrically, and wherein the first fluid channel is formed by radially arranged orifices in the first flushing valve spool.

4. The loop-flushing device according to claim 2, in which the shuttle valve spool has a general cylindrical rod shape, and the passageway is formed by a region of reduced diameter or a longitudinal recess on a mid portion of the shuttle valve spool.

5. The loop-flushing device according to claim 2, in which the shuttle valve spool has a general shape of a bushing, within which the first flushing valve spool is arranged concentrically, and wherein the passageway is axially arranged in the shuttle valve spool.

6. The loop-flushing device according to claim 2, wherein the distal ends of the valve bore are closed fluid tight by end caps to form, together with the valve bore, sensing chambers being in fluid connection either with the first inlet or the second inlet, and wherein a sensing surface of the first flushing valve spool extends into a first sensing chamber of the sensing chambers and a sensing surface of the second flushing valve spool extends into a second sensing chamber of the sensing chambers.

7. The loop-flushing device according to claim 1, in which the first flushing valve spool has a general shape of a bushing, within which at least one end portion of the shuttle valve spool is arranged concentrically, and wherein the first fluid channel is formed by radially arranged orifices in the first flushing valve spool.

8. The loop-flushing device according to claim 7, wherein the second fluid channel is formed by radially arranged orifices in the second flushing valve spool, and wherein the orifices of the first flushing valve spool and the orifices of the second flushing valve spool are of different sizes.

9. The loop-flushing device according to claim 8, in which the shuttle valve spool has a general cylindrical rod shape, and the passageway is formed by a region of reduced diameter or a longitudinal recess on a mid portion of the shuttle valve spool.

10. The loop-flushing device according to claim 7, in which the shuttle valve spool has a general cylindrical rod shape, and the passageway is formed by a region of reduced diameter or a longitudinal recess on a mid portion of the shuttle valve spool.

11. The loop-flushing device according to claim 7, wherein the distal ends of the valve bore are closed fluid tight by end caps to form, together with the valve bore, sensing chambers being in fluid connection either with the first inlet or the second inlet, and wherein a sensing surface of the first flushing valve spool and/or of the shuttle valve spool extends into one of the sensing chambers.

12. The loop-flushing device according to claim 1, in which the shuttle valve spool has a general cylindrical rod shape, and the passageway is formed by a region of reduced diameter or a longitudinal recess on a mid portion of the shuttle valve spool.

13. The loop-flushing device according to claim 1, in which the shuttle valve spool has a general shape of a bushing, within which the first flushing valve spool is arranged concentrically, and wherein the passageway is axially arranged in the shuttle valve spool.

14. The loop-flushing device according to claim 13, in which the first flushing valve spool has a general cylindrical shape, and the first fluid channel is formed by radially arranged orifices in the shuttle valve spool.

15. The loop-flushing device according to claim 1, wherein the distal ends of the valve bore are closed fluid tight by end caps to form, together with the valve bore, sensing chambers being in fluid connection either with the first inlet or the second inlet, and wherein a sensing surface of the first flushing valve spool and/or of the shuttle valve spool extends into one of the sensing chambers.

16. The loop-flushing device according to claim 15, wherein the shuttle valve spool is elastically pre-stressed against the end caps by shuttle valve springs at both end portions of the shuttle valve spool.

17. The loop-flushing device according to claim 16, wherein the end caps are screwed into the valve bore of valve housing, and therewith forming adjustable spring seats for adjusting the pre-stress forces of the shuttle valve springs.

18. The loop-flushing device according to claim 15, wherein the end caps form spool stroke limitations for the first flushing valve spool and/or the shuttle valve spool.

19. A hydraulic apparatus with the loop-flushing device according to claim 1, wherein the first inlet is fed by a high pressure line of the hydraulic apparatus, the second inlet is fed by a low pressure line of the hydraulic apparatus and wherein the discharge outlet leads into a housing or a tank of the hydraulic apparatus.

20. The hydraulic apparatus according to claim 19, wherein the valve housing is an integral part of the housing of the hydraulic apparatus, and wherein the valve bore of the loop-flushing device is situated within the housing of the hydraulic apparatus.

* * * * *